United States Patent
Muriello et al.

(10) Patent No.: US 8,503,718 B2
(45) Date of Patent: *Aug. 6, 2013

(54) USING CAMERA SIGNATURES FROM UPLOADED IMAGES TO AUTHENTICATE USERS OF AN ONLINE SYSTEM

(75) Inventors: Daniel Gregory Muriello, Palo Alto, CA (US); Stephen Charles Heise, Los Altos, CA (US); Jie Chen, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,504

(22) Filed: Sep. 14, 2012

(65) Prior Publication Data

US 2013/0011007 A1 Jan. 10, 2013

Related U.S. Application Data

(63) Continuation of application No. 12/884,137, filed on Sep. 16, 2010.

(51) Int. Cl.
*G06K 9/00* (2006.01)

(52) U.S. Cl.
USPC .......................................................... 382/100

(58) Field of Classification Search
USPC .......................................................... 382/100
See application file for complete search history.

(56) References Cited

U.S. PATENT DOCUMENTS

| | | | | |
|---|---|---|---|---|
| 6,636,259 | B1 * | 10/2003 | Anderson et al. | 348/211.3 |
| 6,999,111 | B2 * | 2/2006 | McIntyre et al. | 348/207.1 |
| 7,433,710 | B2 * | 10/2008 | Bodnar et al. | 455/556.1 |
| 2001/0022621 | A1 * | 9/2001 | Squibbs | 348/232 |
| 2002/0059431 | A1 * | 5/2002 | Terada | 709/227 |

* cited by examiner

*Primary Examiner* — Tom Y Lu
(74) *Attorney, Agent, or Firm* — Fenwick & West LLP (57) ABSTRACT

Users of an online system are authenticated based on signatures of cameras that were used to capture images uploaded to the online system. Users of an online system upload photos taken from their cameras. The online system extracts characteristic information about the camera that captured the photos. This information includes a mapping of faulty pixels, metadata included with the photos, a naming convention, and the like. The online system stores an association between the user and the camera. This association is used for authentication of the user. For authentication, the user is asked to upload new photos taken from the camera that the user used previously. The information extracted from the newly uploaded photos is matched against stored information of cameras used previously by the user. The user is successfully authenticated if the camera used for the newly uploaded photos matches a previously stored camera.

20 Claims, 4 Drawing Sheets

USING CAMERA SIGNATURES FROM UPLOADED IMAGES TO AUTHENTICATE USERS OF AN ONLINE SYSTEM

CROSS-REFERENCE TO RELATED APPLICATIONS

This application is a continuation of U.S. patent application Ser. No. 12/884,137, titled "Using Camera Signatures from Uploaded Images to Authenticate Users of an Online System" filed on Sep. 16, 2010, which is incorporated by reference herein in its entirety.

BACKGROUND

This invention relates to associating cameras with users of an online system that allows users to upload and store images, and in particular to authenticating users based on camera signatures obtained from the images.

Several online systems require users to register to create a user account. Online systems often store sensitive information about users, for example, credit card information, social security number, date of birth, and the like. Some online systems allow users to perform important actions including monetary transactions, sending business or private messages, etc. Therefore online systems authenticate user requests before providing access to information or allowing an action to be performed. Typical authentication requires a user to provide login and password which is verified against previously stored information.

In certain situations authentication based on login and password may not be possible or may be deemed insufficient. For example, if a user forgets the user's password, an alternative mechanism is required to authenticate the user. In other situations, there can be suspicious activity in the user account that indicates that the login and password may have been stolen and the account used illegally. For example, the user account may be suspected of sending large number of messages indicative of spam activity. In these situations, the user account may be locked. The user is required to pass enhanced authentication procedures to ensure that the account is being used by the authentic owner of the account.

Online systems often use procedures that require manual intervention for enhanced authentication. For example, the user may be asked to call and provide information for verifying authenticity of the user. Alternatively, the user may be asked to send some form of photo identification or a copy thereof for verification. These procedures are often expensive for an online system to support since they can require maintenance of a call center or personnel for manual processing.

SUMMARY

Embodiments of the invention authenticate users of an online system based on cameras associated with images and videos previously uploaded by the user. Images received from a user of an online system are analyzed to identify images with matching information. The matching information for the images is used to generate a signature for the camera, which is then associated with an account for the user. At some point later, the user may request access to the online system. In response to the user's request for access, the online system sends the user a request to authenticate the user's account by providing additional images taken from the user's camera. The additional images as requested are received from the user and compared to the signature of the camera that is associated with the user's account. If the additional images match the signature of the camera, the user is provided access to the online system.

In one embodiment, the images are analyzed by identifying one or more faulty pixels, lens scratches, dust on lens, or camera artifacts in the images. Two images are considered matching if they have matching faulty pixels, lens scratches, dust identified on lens, or camera artifacts. The images can also be analyzed by extracting metadata from files associated with the images. The additional images are compared with the signature of the camera by matching metadata attributes extracted from files associated with the images. These metadata attributes include serial numbers of the camera, model number of the camera, or make of the camera. The metadata attributes can also comprise information including the time that an image was captured, timezone recorded in an image, geographical location at which the image was captured, or a naming convention for the file storing the image. This metadata, faulty pixels, lens scratches, and camera artifacts may act as a shared secret between the user and the online system, as previously uploaded images and videos have had the metadata, faulty pixels, lens scratches, and camera artifacts removed or obscured. The images can also be analyzed by matching the subject matter of the photograph, such as the person being photographed.

In another embodiment, one or more camera signatures associated with the user are stored in the online system. Each camera signature comprises characteristic information about the camera obtained from images taken from the camera. The user requests access to information or other computing resources of the online system, and responsive to that request the user is sent a request to upload one or more images. Once the user uploads the requested one or more images, these are matched with a camera signature associated with the user. The matching of the uploaded image with a camera signature comprises comparing attributes of the uploaded image with values of attributes associated with the camera signatures. If the uploaded image matches at least one of the camera signatures associated with the user, the user is granted access to the requested information.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Enhanced authentication procedures are required to authenticate users who have lost their usual authentication information, for example, password. Similarly enhanced authentication procedures can be required to verify user accounts that are locked due to suspicious activities indicating that the account credentials may have been stolen. Involving manual processes for enhanced authentication requires significant infrastructure on the part of the online systems. For example, requiring the user to answer questions via phone requires maintenance of call centers. Therefore, there is a need for enhanced authentication procedures that can be fully automated without requiring personnel to execute a manual process.

Embodiments of the invention associate a user with a camera used for capturing images uploaded to the online system by the user. Examples of cameras include standalone camera devices as well as cameras embedded within other devices, for example, phones or laptops. Images uploaded by the user are analyzed to determine signatures of cameras used to capture the images. A camera signature comprises features extracted from an image that characterize the camera used for capturing the image. Examples of information extracted from an image that characterizes a camera comprise faulty pixel positions in the camera, metadata available in a file storing the image including, serial number of the camera, the make and model number of the camera and the like. Camera signatures identified for a user are associated with the user and stored.

If enhanced authentication is required for the user, the user is required to upload additional images taken from the user's camera. The additional images are analyzed to extract camera information which is compared to stored camera signatures. If the additional images match existing camera signatures, the user successfully passes enhanced authentication. The chances that a person who illegally steals the online identity of a user also has access to a physical device, for example a camera of the user are considered extremely low. If user is able to provide additional images taken by the camera, the user is considered to be in possession of the user's personal devices and is therefore considered the authentic owner of the user account.

Figure 1:
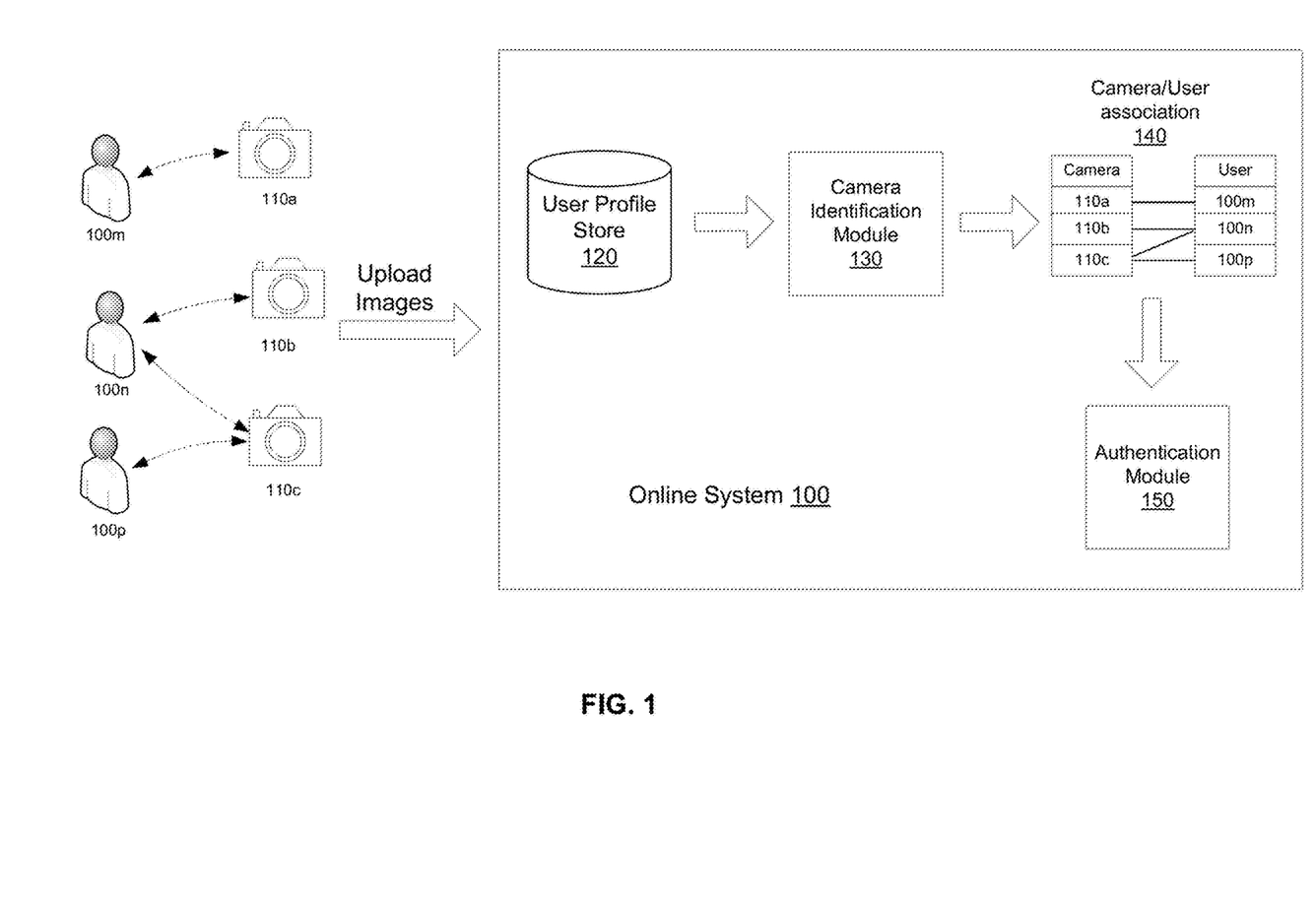
FIG. 1 is a diagram of the overall process for associating camera signatures with users of an online system, in accordance with an embodiment of the invention.

FIG. 1 is a diagram of the overall process for associating camera signatures with users of an online system, in accordance with an embodiment of the invention. The users $100m$, $100n$, and $100p$ use their cameras $110a$, $110b$, and $110c$ respectively to capture images and upload the captured images to the online system 100. (A letter after a reference numeral, such as "$110a$," indicates that the text refers specifically to the element having that particular reference numeral, while a reference numeral in the text without a following letter, such as "110," refers to any or all of the elements in the figures bearing that reference numeral.) A camera may be shared by two or more users, for example, camera $110c$ is shared by users $100n$ and $100p$. Similarly, a user may use two or more cameras, for example, user $100n$ uses cameras $110b$ and $110c$. The online system 100 stores the images uploaded in the user profile store 120. The camera identification module 130 analyzes images uploaded by the user to determine signatures identifying the cameras based on image data. The camera identification module 130 creates an association 140 between the signatures of the cameras 110 and the accounts of the users 100. The authentication module 150 uses this association for performing enhanced authentication of users 100 whenever required.

System Architecture

Figure 2:
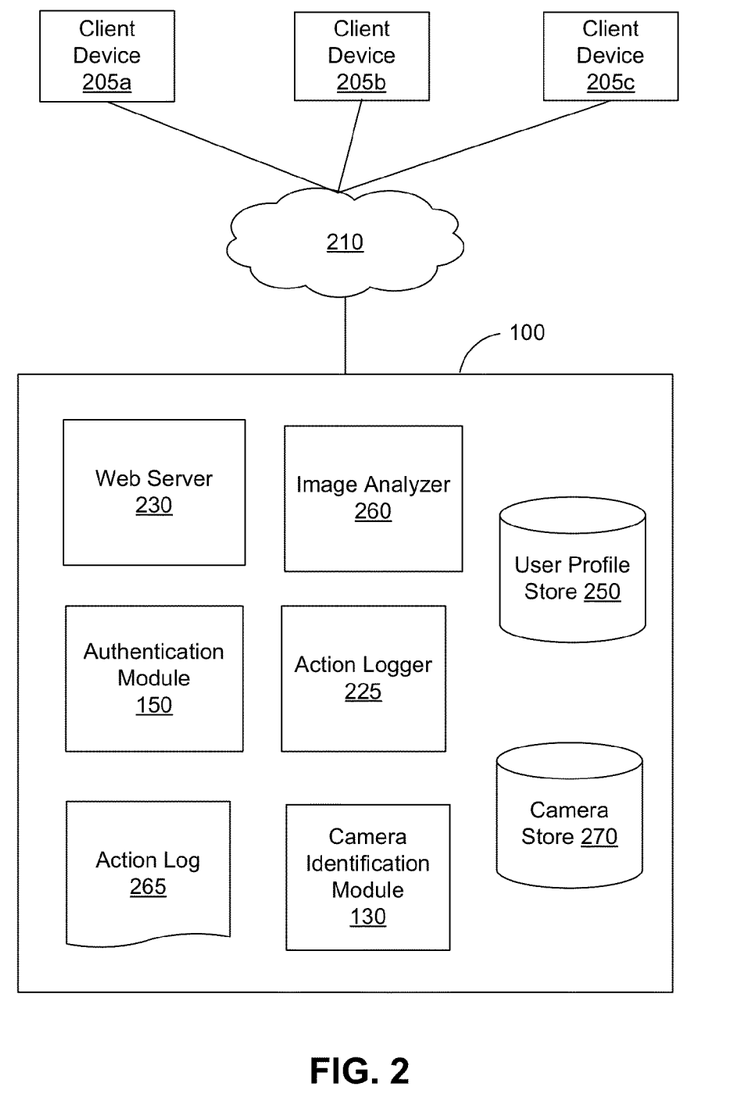
FIG. 2 is a high level block diagram illustrating a system environment suitable for associating cameras with users, in accordance with an embodiment of the invention.

FIG. 2 is a high level block diagram illustrating a system environment suitable for associating cameras with users, in accordance with an embodiment of the invention. The system environment comprises one or more client devices 205, an online system 100, and a network 210. In alternative configurations, different and/or additional modules can be included in the system.

The client devices 205 comprise one or more computing devices that can receive user input and can transmit and receive data via the network 210. In one embodiment, the client device 205 is a conventional computer system executing, for example, a Microsoft Windows-compatible operating system (OS), Apple OS X, and/or a Linux distribution. In another embodiment, the client device 205 can be a device having computer functionality, such as a personal digital assistant (PDA), mobile telephone, video game system, etc. The client device 205 is configured to communicate via network 210. The client device 205 can execute an application, for example, a browser application that allows a user of the client device 205 to interact with the online system 100. The interactions of the user via the application running on the client device 205 include uploading media content including images and videos to the online system 100 as well retrieving view media content or information stored on the online system 100.

In one embodiment, the network 210 uses standard communications technologies and/or protocols. Thus, the network 210 can include links using technologies such as Ethernet, 802.11, worldwide interoperability for microwave access (WiMAX), 3G, digital subscriber line (DSL), etc. Similarly, the networking protocols used on the network 210 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 210 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), Internet Protocol security (IPsec), etc. A user can use a client device 205 to upload images or videos to the online system 200 via the network 210 and also retrieve the images stored on the online system 200 for viewing.

The online system 100 includes a web server 230, an action logger 225, a user profile store 250, a camera store 270, an action log 265, a camera identification module 130, an image analyzer module 260, and an authentication module 150. In other embodiments, the online system 100 may include additional, fewer, or different modules for various applications. Conventional components such as network interfaces, security mechanisms, load balancers, failover servers, management and network operations consoles, and the like are not shown so as to not obscure the details of the system.

The web server 230 links the online system 100 via the network 210 to one or more client devices 205; the web server 230 serves web pages, as well as other web-related content, such as Java, Flash, XML, and so forth. The web server 230 may provide the functionality of receiving and routing messages between the online system 100 and the client devices 205, for example, instant messages, queued messages (e.g., email), text and SMS (short message service) messages, or messages sent using any other suitable messaging technique. The user can send a request to the web server 230 to upload information, for example, images or videos that are stored in the user profile store.

The action logger 225 is capable of receiving communications from the web server 230 about user actions on and/or off the online system 100. The action logger 225 populates the action log 265 with information about user actions to track them. Such actions may include, for example, sending a message to the other user, uploading an image, reading a message from the other user, viewing content associated with the other user, among others.

The user account information and other related information for a user is stored in the user profile store 250. The user profile information stored in user profile store 250 describes the users of the online system 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with the identification information of the appropriate users displayed in an image.

The image analyzer module 260 analyzes images uploaded by a user to determine information characterizing the cameras used to capture the images. The image analyzer module 260 analyzes the metadata available in image files or the pixel data of the images to determine specific characteristics of a camera used to capture images. For example, the image analyzer module 260 extracts metadata including serial number, model and make of the camera, pixel dimensions, image resolution and other characteristics useful to determine if an image was taken from a camera. The image metadata may be represented using a standard format, for example, the exchangeable image file format (EXIF).

The image analyzer module 260 also extracts unique patterns of faulty pixel positions associated with the images. A faulty pixel displays a constant value (or one of a set of constant values) at the specific position regardless of the input received by the camera. The faulty pixel may show a value that is too bright or too dim compared to a value that would be obtained by a camera without a faulty pixel. A normal pixel in contrast shows one of a range of values of color depending on the input received by the camera. For example, the faulty pixel may show a color that is different from a normal pixel subject to identical exposure. As a result, a distribution of the parameters associated with a faulty pixel, for example, the color as observed over several images is different from the corresponding distribution of a working or non-faulty pixel. For example, a working pixel may have a normal distribution of the pixel attributes observed over several images whereas the faulty pixel is likely to be skewed compared to the distribution of a working pixel. The image analyzer module 260 analyzes distribution of various pixels over a set of images and compares the distributions for the different pixels. The majority of pixels show a normal distribution whereas some faulty pixels show a distribution that is skewed compared to the normal pixels. These variations in the distribution of pixel values are used to identify faulty pixels. Other parameters that characterize a faulty pixel include light sensitivity (or lack thereof) for each color, minimum/maximum values for each color, and bleed of bright colored pixels to other pixels. In some embodiments, image analyzer module associated other image artifacts, for example, images being too bright or too dim when taken from a specific camera. Similarly, image analyzer can identify camera artifacts, for example, the clock skew associated with a camera. The images that are uploaded by the user may get further processed for example, image artifacts may be removed, various transformations may be provided by the images, image data may be compressed, images may be resized before the images are displayed to the user. Therefore, a person downloading the images cannot reproduce or analyze the image information that is obtained by the image analyzer module 260. Accordingly, a person cannot analyze the images associated with a user by downloading them from the online system and then attempt to modify an image to appear as if it was taken by someone else's camera.

In some embodiments, a pixel comprises elements displaying different colors, for example, a pixel can comprise three elements with signals corresponding to red, green, and blue colors (RGB elements). One or more of these elements can be faulty resulting in a particular color missing or always being present in the pixel irrespective of the input picture. Accordingly, the specific element of the pixel can be considered faulty. If a portion of a pixel is faulty the pixel is considered faulty. In addition, lens artifacts may not be on the image sensor but in the image optical path. Indicated by the zoom level, the affected pixels where the lens scratch appears may change.

Once the camera identification module 130 associates a camera with a user, the camera identification module 130 compares subsequently uploaded images against the signatures of cameras associated with the user. If new images uploaded provide additional metadata for the camera that was not available previously, the camera identification module 130 updates the information characterizing the camera in the camera store 270. In some situations, information characterizing the camera can be overwritten, for example, if the user changes a default setting. However the camera authentication module 130 ensures that the image shows significant match against the camera signature and is not likely to be taken with a different camera. If the mismatch compared to the camera signature is above a threshold value (for example, based on a weighted combination of various attribute matches/mismatches) a new camera signature is created and stored in the camera store 270 and associated with the user. For example, if the faulty pixel positions of the newly uploaded images is different from the faulty pixel positions of the stored camera signatures or if the serial number, make and model numbers obtained from the metadata of the uploaded images indicates that the uploaded images were captured by a new camera, a new camera object is created and stored in the camera store 270.

The camera identification module 130 uses the information analyzed by the image analyzer module 130 to determine camera signatures that are stored in the camera store 270. The camera identification module 130 matches information extracted from multiple images to determine whether the images are related to a specific camera. In some embodiments, the camera identification module 130 associates attributes of images used for associating the images with camera with a confidence score indicative of a degree of certainty with which the association is determined. For example, the serial number of a camera if available in the image metadata provides a higher level of certainty compared to make of the camera. Similarly a unique set of faulty pixels in images captured from a camera is given a confidence score indicative of high degree of certainty compared to make and model of the camera. A mismatch in an attribute like make or model or pixel resolution of the camera can be used to reject the image as having been captured using a specific camera.

Other types of information used for associating an image with a camera include naming conventions of files storing the image, for example, a camera can use a monotonically increasing alphanumeric string for automatically naming consecutively captured images. The image metadata may provide information that allows correlation of images. If a set of images are determined to be correlated, even if a subset of the images is determined to be captured by a camera, the remaining images of the set can be assumed to be captured by the same camera. For example, images may be correlated if the image metadata, for example, time of capturing of the image indicates that the images were captured during a very short time interval at the same place. Similarly, images can be considered correlated if they have geographical data, for example, latitude, longitude, or altitude that is in close proximity. For example, a user may capture several images during a trip. Therefore, unless there is evidence to the contrary, the images can be assumed to be captured by the same camera. The images can be determined to be correlated based on a naming scheme used for the images. Typically, cameras assign automatic names to files associated with images taken consecutively based on a sequence. Therefore, if the names of the images form an alphanumeric sequence that is monotonically increasing, any image file that has a name that belongs to the sequence is likely to be taken from the same camera.

In an embodiment, the camera identification module 130 compares a newly discovered camera signature against existing camera signatures stored in the camera store 270 to determine if the camera was already stored in the camera store 270. For example, the user may have borrowed the camera from another user of the online system 100. In this situation, the existing camera object is identified from the camera store 270 and the user is associated with the existing camera object.

In an embodiment, the camera identification module 130 tracks usage of the cameras to identify cameras that the user is likely to have stopped using. For example, if no images are being uploaded with a particular camera signature for a long period of time, exceeding a threshold value, the camera can be marked as not being in use. Alternatively, the camera identification module can delete the camera from the camera store after a particular time interval, if no pictures taken from the camera are uploaded by the user during this time interval. In some embodiments, the camera object is not deleted from the camera store 270 but the association between the user and the camera is deleted. For example, the camera may be sold or gifted to another user and there is a possibility that the camera is used by another user in future to capture images and upload them. Similarly, the camera may even be lost by one user of the online system 100 but recovered by another user of the online system 100. If the other user uploads images taken from the recovered camera, the online system 100 stores the information that the association of the camera changed from one user to another. Accordingly, the representation of the mapping from users to cameras stored in the online system 100 adaptively changes over time to represent the real world association between users and their cameras.

In another embodiment, users of the online system 100 are requested to provide specific information related to cameras previously used to capture pictures uploaded to their user account. The user can further provide information associating the camera with one or more images uploaded by the user. The information provided by the users is combined with information derived from the images. For example, faulty pixel positions determined by analyzing images are associated with a serial number of the camera provided by a user.

The authentication module 150 authenticates user session based on credential of the users establishing the session. Typically, the authentication manager uses a login and password of the user to authenticate a session. In specific situations, the authentication manager requires enhanced authentication, for example, if there are more than a threshold number of failed attempts to login by the user, or if the user has forgotten the password, or if the user account is involved in suspicious activity indicative of the fact that the user account has been stolen. The authentication module 150 requires the user to upload one or more images captured by a camera previously used by the user. The authentication module 150 matches the images uploaded by the user against the signatures of the cameras associated with the user. If the user successfully provides images captured by a camera that was previously used for capturing images uploaded by the user to the online system 100, the user session is authenticated.

In an embodiment, the user provides information identifying another user and uploads images taken from a camera previously used by the other user for capturing images uploaded by the other user to the online system 100. For example, the user may not have access to a camera used previously but may have access to a camera used by the user's spouse. The other user effectively vouches for the user. If the images match with the signature of the camera of the other user, the user session is authenticated.

Figure 3:
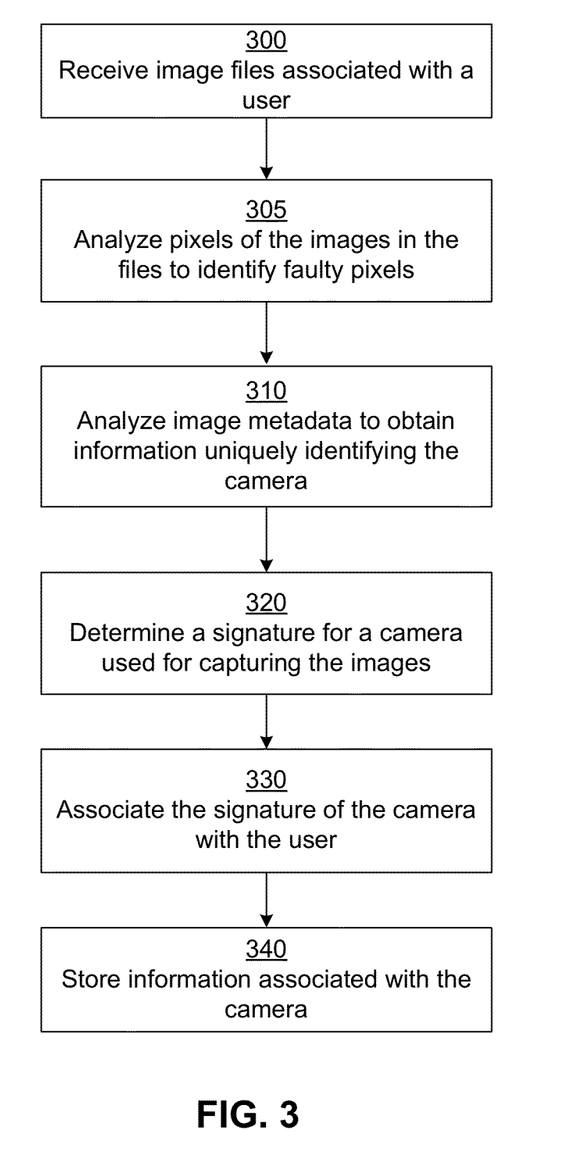
FIG. 3 is a flowchart of a process for associating cameras with users of an online system, in accordance with one embodiment of the invention.

FIG. 3 is a flowchart of a process for associating cameras with users of an online system, in accordance with one embodiment of the invention. The web server 230 receives 300 images associated with a user, for example, images uploaded by a user in the online system. The camera identification module 130 analyzes 305 pixel data of the images received to identify faulty pixels in the images. The camera identification module 130 analyzes 310 the images to obtain metadata uniquely identifying a camera used for capturing the images. The camera identification module determines 320 a unique signature for a camera comprising features of images taken from the camera that can be observed using the metadata obtained from the image files and the faulty pixel positions. The camera and its signature are associated 330 with the user who uploaded the images captured by the camera. The information representing the camera is stored in the camera store 270. The camera identification module analyzes 310 pixel data to determine faulty pixels of the camera.

Some attributes of the metadata can be used to associate the image with a specific camera with a very high degree of certainty, for example, if the image metadata includes a serial number of the camera, the serial number can be used to uniquely map the images to a specific camera. Other attributes obtained from image metadata can be used to map the image to a camera with lesser degree of certainty. For example, the make and model number of a camera, if available in the image metadata helps correlate the images to a camera to a lesser degree compared to a serial number. However, these attributes can be combined with other attributes to confirm a particular camera signature. In an embodiment a weighted combination of various attributes is used to determine a camera signature associated with images. Other attributes used for determining camera signature include pixel dimensions of the image, a version of software installed on the camera, image resolution, focal length, shutter speed, ISO, lens type, image compression used etc. Typically attributes of image metadata useful for identifying a camera are attributes that do not change with every image. These attributes may correspond to a default setting that was provided with the camera and is used in metadata of images.

It is possible that camera clocks are not set correctly. For example a user may upload images or videos with metadata indicating that the images were taken 22 hours in the future (clock skew). Accordingly, when a challenge image or video is uploaded the timestamp of the image or video is expected to be at least 22 hours in the future. Similarly if the user consistently uploads photos that are dated 2 years into the past, the challenge images uploaded are also expected to be dated 2 years in the past.

Figure 4:
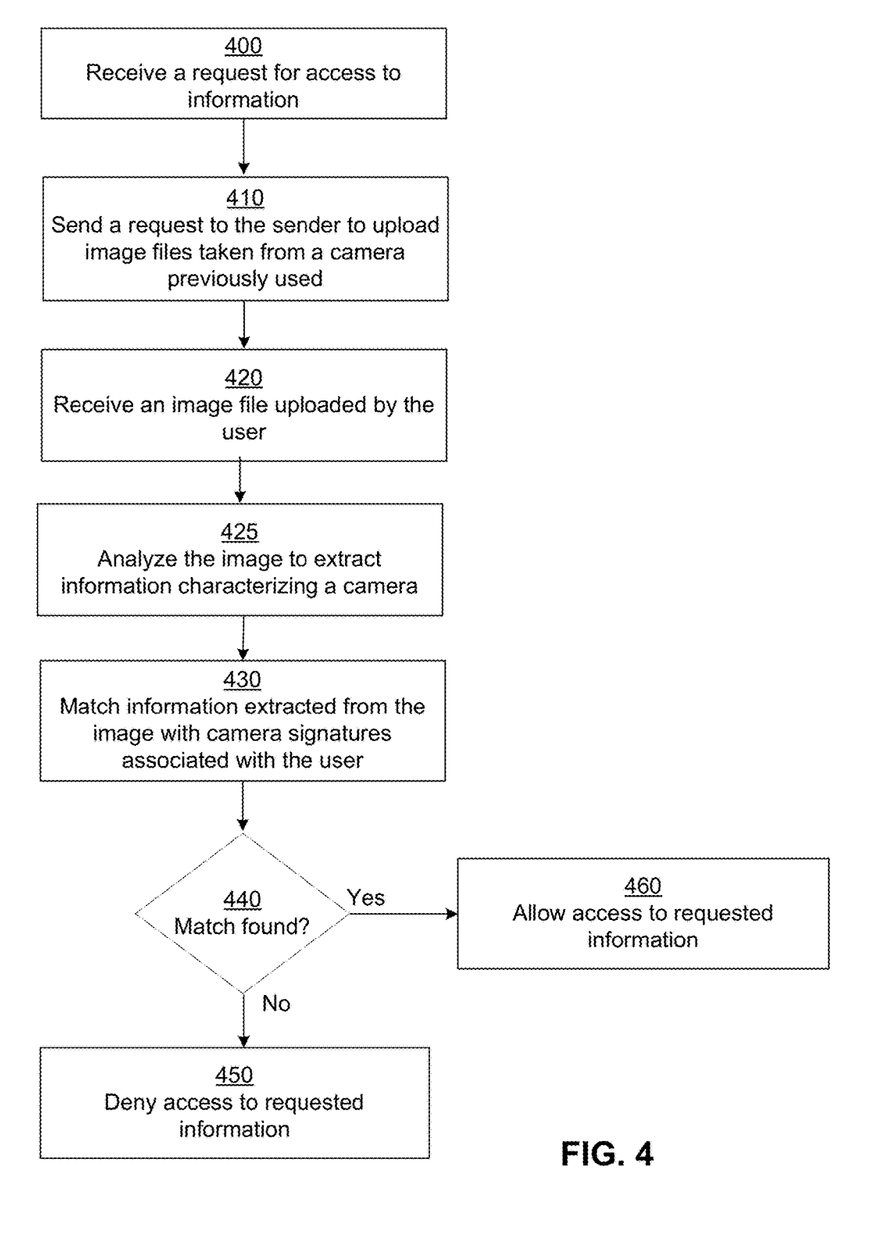
FIG. 4 is a flowchart of a process for authenticating a user based on cameras associated with the users, in accordance with one embodiment of the invention.

FIG. 4 is a flowchart of a process authenticating a user based on cameras associated with the users in an online system, in accordance with one embodiment of the invention. Typically, user requests for information are authenticated based on a login and password. In special situations, for example, if the user account has been locked due to suspicious activity or if the user has lost the password, enhanced authentication may be required as described herein. The web server 230 receives 400 a request for access to information. The authentication manager 150 determines a need to follow an enhanced authentication process and sends 410 a request to the sender to upload image files taken from a camera previously used by the sender for capturing images uploaded to the system 100 and stored in the user profile store 250. The sender uploads an image file taken from the sender's camera and the image file is received 420 by the web server 230. The image analyzer module 260 analyzes 425 the image to extract information characterizing the camera used to capture the image. The information extracted is the same kind of information used to derive signatures of the cameras and includes information extracted from the image metadata as well as faulty pixel positions.

The authentication manager 150 matches the information extracted from the image with the camera signatures associated with the user. A pixel of the newly uploaded images is considered to be faulty if the pixel color (or any other pixel attribute) matched the set of values associated with the faulty pixel. It is possible that the pixel for the image is a normal pixel that happens to show the value as shown by a faulty pixel. However, the probability of all the pixels in the positions of the faulty pixels having the faulty values in the image by sheer coincidence is considered very low. Furthermore, the probability of such a coincidence can be further reduced by asking the user to provide more than one image for authentication. Also, matching is performed based on multiple attributes including attributes obtained from the metadata, thereby further reducing the possibility of incorrect matching of an image with a signature.

If the authentication manager 150 finds that the image matches a camera signature previously stored for the user, the user is granted access to the requested information. If the authentication manager 150 is unable to match the uploaded image with any camera signature associated with the user, the authentication manager 150 may either deny access to the requested information or ask the user to upload more images or use a different camera that the user may have used in the past. The authentication manager 150 can allow up to a threshold number of attempts to authenticate the user by uploading images taken from the user's camera before denying access to the requested information.

The disclosed embodiments allow an online system to beneficially authenticate a user by associating a user with a camera used by the user for capturing images uploaded to the online system. The embodiments allow automated authentication by online systems without requiring manual steps that may be prohibitively expensive for online systems to maintain and support.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving a plurality of images from a user of an online system;
extracting from the plurality of images a characteristic of a camera used to capture the images;
receiving a request from the user for access to the online system;
responsive to the request from the user, sending a request to the user to authenticate the user by providing one or more additional images taken from the camera;
receiving the requested one or more additional images from the user;
extracting from the one or more additional images a characteristic of a camera used to capture the one or more additional images
comparing the characteristic of the camera extracted from the one or more additional images with the characteristic of the camera extracted from the plurality of images; and responsive to the characteristic of the camera extracted from the one or more additional images matching the characteristic of the camera extracted from the plurality of images, providing the user with the requested access to the online system.

2. The computer-implemented method of claim 1, wherein extracting from the plurality of images the characteristic of the camera comprises identifying at least one of a faulty pixel in the images, lens dust, and lens scratches based on information received in the images.

3. The computer-implemented method of claim 2, wherein a faulty pixel has a fixed value for any image captured by the camera irrespective of the input received by the camera while capturing any image.

4. The computer-implemented method of claim 2, wherein each faulty pixel is associated with a position of images taken from the camera with a skewed distribution of an attribute of the pixel across images.

5. The computer-implemented method of claim 1, wherein extracting from the plurality of images the characteristic of the camera comprises retrieving metadata attributes from files associated with the images.

6. The computer-implemented method of claim 5, wherein a metadata attribute is at least one of a serial number, a make of the camera, and a model number of the camera.

7. The computer-implemented method of claim 5, a metadata attribute is a name of the image files.

8. The computer-implemented method of claim 5, wherein matching a metadata attribute comprises determining if the attribute value belongs to a sequence described by attribute values extracted from the plurality of images.

9. The computer-implemented method of claim 1, wherein extracting from the plurality of images the characteristic of the camera comprises determining a distribution of pixel values across images and identifying pixels with skewed distribution of pixel values.

10. The computer-implemented method of claim 1, wherein a camera characteristic comprises an attribute of metadata associated with images with monotonically changing values for images taken consecutively from the camera.

11. The computer-implemented method of claim 1, wherein a camera characteristic comprises a naming convention associated with image files captured using the camera.

12. The computer-implemented method of claim 1, wherein a camera characteristic comprises an attribute having monotonically increasing alphanumeric values associated with images taken consecutively from the camera.

13. The computer-implemented method of claim 1, wherein a camera characteristic comprises an attribute of metadata uniquely identifying the camera.

14. The computer-implemented method of claim 1, wherein a camera characteristic comprises pixel dimensions of the image.

15. A computer program product comprising a non-transitory computer-readable storage medium storing computer program modules configured to execute on a computer processor, the computer program modules comprising:
a camera identification module configured to:
receive a plurality of images from a user of an online system;
extract from the plurality of images a characteristic of a camera used to capture the images; and
an authentication module configured to:
receive a request from the user for access to the online system;
responsive to the request from the user, send a request to the user to authenticate the user by providing one or more additional images taken from the camera;
receive the requested one or more additional images from the user;
extract from the one or more additional images a characteristic of a camera used to capture the one or more additional images
compare the characteristic of the camera extracted from the one or more additional images with the characteristic of the camera extracted from the plurality of images; and
responsive to the characteristic of the camera extracted from the one or more additional images matching the characteristic of the camera extracted from the plurality of images, provide the user with the requested access to the online system.

16. The computer program product of claim 15, wherein extracting from the plurality of images the characteristic of the camera comprises identifying at least one of a faulty pixel in the images, lens dust, and lens scratches based on information received in the images.

17. The computer program product of claim 16, wherein a faulty pixel has a fixed value for any image captured by the camera irrespective of the input received by the camera while capturing any image.

18. The computer program product of claim 16, wherein each faulty pixel is associated with a position of images taken from the camera with a skewed distribution of an attribute of the pixel across images.

19. The computer program product of claim 15, wherein extracting from the plurality of images the characteristic of the camera determining a distribution of pixel values across images and identifying pixels with skewed distribution of pixel values.

20. The computer program product of claim 15, wherein extracting from the plurality of images the characteristic of the camera comprises retrieving metadata attributes from files associated with the images, wherein a metadata attribute is at least one of a serial number, a make of the camera, and a model number of the camera.

* * * * *

UNITED STATES PATENT AND TRADEMARK OFFICE
CERTIFICATE OF CORRECTION

PATENT NO.       : 8,503,718 B2                         Page 1 of 1
APPLICATION NO.  : 13/617504
DATED            : August 6, 2013
INVENTOR(S)      : Daniel Gregory Muriello et al.

It is certified that error appears in the above-identified patent and that said Letters Patent is hereby corrected as shown below:

On the Title Page

Page 1, Item 63, Related U.S. Application Data, after "Sep. 16, 2010," insert -- now Pat. No. 8,306,256 --.

Signed and Sealed this
Fifteenth Day of July, 2014

Michelle K. Lee
*Deputy Director of the United States Patent and Trademark Office*